(12) United States Patent
Sobeski et al.

(10) Patent No.: US 7,346,857 B2
(45) Date of Patent: *Mar. 18, 2008

(54) DYNAMIC CONTROLS FOR USE IN COMPUTING APPLICATIONS

(75) Inventors: David A. Sobeski, Redmond, WA (US); Jules S. Cohen, Seattle, WA (US); Lisa G. Post, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 484 days.

This patent is subject to a terminal disclaimer.

(21) Appl. No.: 10/968,485

(22) Filed: Oct. 19, 2004

(65) Prior Publication Data

US 2005/0081165 A1    Apr. 14, 2005

Related U.S. Application Data

(63) Continuation of application No. 09/565,313, filed on May 5, 2000, now Pat. No. 6,819,343.

(51) Int. Cl.
*G06F 6/00* (2006.01)
*G06F 13/00* (2006.01)

(52) U.S. Cl. ...................... 715/848; 715/853

(58) Field of Classification Search ............. 715/848, 715/853–854, 762–765, 839, 840, 811, 825, 715/835

See application file for complete search history.

(56) References Cited

U.S. PATENT DOCUMENTS

| | | | | |
|---|---|---|---|---|
| 5,796,393 | A | * | 8/1998 | MacNaughton et al. ..... 715/733 |
| 6,496,203 | B1 | * | 12/2002 | Beaumont et al. .......... 715/762 |
| 6,507,845 | B1 | | 1/2003 | Cohen et al. |

* cited by examiner

*Primary Examiner*—Cao (Kevin) Nguyen
(74) *Attorney, Agent, or Firm*—Woodcock Washburn LLP

(57) ABSTRACT

A system and process for providing adaptable controls to computing applications to facilitate interaction by an operator with computing application content is provided. The present invention provides a system to update the control parameters remote to the computing application to reflect changes in operator's preferences. In an illustrative implementation, these dynamic controls may take the form of an add-on toolbar having drop down menus that have the form of panes. In operation, the computing application launches and retrieves the parameters of these controls through messaging from a remote server computer. When launched, the computing application will display the add-on toolbar, maintaining Web-in-Web panes, having the latest updated parameters (i.e. content, look, and feel of the toolbar and panes) as found on the remote server computer. These parameters may be changed by the operator to reflect changes in their content or feature preference.

16 Claims, 10 Drawing Sheets

DYNAMIC CONTROLS FOR USE IN COMPUTING APPLICATIONS

REFERENCE TO RELATED APPLICATIONS

This application is a continuation application and claims priority to U.S. patent application Ser. No. 09/565,313, filed May 5, 2000 now U.S. Pat. No. 6,819,343, entitled "Dynamic Controls for Use in Computing Applications", which is incorporated herein by reference in its entirety.

BACKGROUND OF THE INVENTION

1. Field of the Invention

The present invention relates to the field of computer systems, and more particularly to adaptable controls used to control content within computing applications.

2. Brief Description of Prior Developments

There has recently been a tremendous growth in the number of computers connected to the Internet. A client computer connected to the Internet can download digital information from server computers. Client application software typically accepts commands from a user and obtains data and services by sending requests to server applications running on the server computers. The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML).

An intranet is a local area network containing Web servers and client computers operating in a manner similar to the World Wide Web described above. Typically, all of the computers on an intranet are contained within a company or organization. A client computer connected to a network, such as a local area network, wide area network, an intranet, or the Internet, can download digital information from server computers. This digital information can be presented to a user with and executed by a Web browser computing application.

A Web browser is a client application or, preferably, an integrated operating system utility that communicates with server computers via File Transfer Protocol (FTP), Hyper Text Transfer Protocol (HTTP) and Gopher protocols. Web browsers receive content from a server sent over the Internet that is typically encoded in Hyper Text Markup Language (HTML) and executed by the browser on a client computer. Such HTML documents may include scripts (e.g. Java Scripts or Visual Basic Scripts) that allow for some basic flexibility. To go beyond what is possible with HTML and embedded scripts, browsers typically support the usage of additional components such as Java Applets, ActiveX Controls and Plug-Ins that provide extra functionality.

In prior versions of the Web browser computing application, an operator was offered conventional toolbar controls by which he/she could browse the web. These controls provided basic browsing functions such as, navigating between and controlling web pages (i.e. moving back and forth between already browsed web pages, refreshing web pages, stopping the loading of a web page, browsing to "Favorite" web pages, loading "Channels", and viewing browsing history) and controlling the web browser application itself (i.e. resizing the browser, and printing). Such conventional toolbar controls, however, do not afford an operator of the Web browser computing application the ability to navigate directly to a given web page or a set of web pages. Further, existing Web browser toolbars are static and, for the most part, do not provide any additional content that may be of use or interest to an operator of the web browser.

Generally, conventional web browsing applications operate such that they provide a single Web browsing session (i.e. an instance in which a web page may be navigated) when the Web browsing application is launched. Although these web browsers do provide the operator the ability to launch additional web browsers, thereby creating additional Web browsing sessions, the operator is still foreclosed from viewing additional web pages (i.e. web page content) within a singly launched web browser.

There are several advantages in having multiple web browsing sessions within a singly launched Web browser computing application, including, providing operators the ability to view real time updated Web content, affording operators the ability to browse multiple Web pages, and providing Web content providers the ability to integrate their Web content directly with a Web browser application. Such advantages may increase an operator's browsing efficiency, significantly add value to an operator's Web browsing experience, and provide an effective marketing tool for Web content providers to showcase their Web content.

Further, in prior versions of Web browser computing applications, the Web browser computing application offered conventional toolbars that generally provided web navigation controls. These toolbars are generally hard-coded within the web browser application yielding toolbars that were static in appearance and, more importantly, in the functionality the toolbar could offer. With static toolbars, an operator of the web browser application is corralled in experiencing a specific set of functions and operations, thereby limiting the overall web-browsing experience. Additionally, as a result of static web browser toolbars, web content providers were foreclosed from updating content within a toolbar to reflect recent changes and/or modifications.

Stated differently, conventional web browsing applications provide an operator with toolbar(s) that perform various functions that range from web navigation (i.e. navigation between web sites and web pages within web sites) to sizing and positioning of the web browser application itself. Web browser toolbars facilitate the use of the Web browser computing application and add value to an operator's browser experience. Generally however, these toolbars are hard-coded with predetermined values that indicate a toolbar's look and feel (e.g. size, shape, color, and position) and, more importantly, that describe the functions that the various components of the toolbar perform (e.g. when the "History" button of the navigation toolbar is depressed, list a history of the operator's latest web site(s) and/or web page(s) visited). Although, toolbar values may be updated by modifying the browser application code, such changes require extensive resources (i.e. time and labor) and are extremely impractical. Additionally, such updates generally occur with new releases of the web browser application thereby limiting web content providers to updating toolbar content and/or functionality around such release dates.

It is thus desired to implement a system that would allow for the creation and maintenance of dynamic and updateable computing application panes cooperating with dynamic and updateable toolbars. At the core of this invention that could achieve these advantages is an apparatus and methods that would capitalize on existing computing application technologies.

SUMMARY OF THE INVENTION

The present invention applies to computing applications offering a plurality of content controlling features and panes. In an illustrative implementation, the invention is directed to a system for providing multiple instances of Web browsing sessions within a singly launched Web browser computing application. The Web browser computing application may create and control a plurality of Web browsing sessions providing an operator the ability to view and interact with various Web content. In this illustrative implementation, the invention may create operator-defined, content-rich, dynamically-updated "toolbars" that provide operators the ability to navigate directly to desired web-page(s) and quickly view desired Web content. A new navigation "toolbar", having buttons with predefined functions, may be integrated within an existing Web browser application such that Web sessions are created with the use of the "toolbar" buttons. These created Web sessions may take the form of additional Web browser computing application panes (Web-in-Web panes) containing updateable Web content. An operator may use such panes to view and interact with various Web content (including navigating to other web pages). These panes may be viewable to the operator regardless of a web browser's position within a display device.

Further, the present invention is directed to a system for providing dynamic pane generation and configuration between a computing application and a computer server. Wherein upon the launch of the computing application, the computing application communicates with a computer server to retrieve information specific to the creation of a toolbar. This information contains values that define the look and feel of the tool bar, and, more importantly, to define various functions the components of the toolbar perform. The toolbar information on the computer server may be updated periodically to integrate new toolbar functionality and/or to change the look and feel of the toolbar.

Additionally, the operator of these dynamic and updateable computing application panes and toolbars is afforded the ability to customize the content of a toolbar based upon an operator's preference. Alternatively, an operator may input specific preferences to a computing application that may be communicated to and stored on a computer server housing toolbar information. Through a secondary computing application residing on the computer server, an affinity may be determined between the user's preferences and the functions offered to the toolbar. This affinity may be used when toolbar information is retrieved from the computer server to create a customized toolbar having an appearance and, more importantly, functions in accordance with the operator's preferences.

DETAILED DESCRIPTION OF THE DRAWINGS

The system to provide dynamic and updateable computing application panes and toolbars for use in computer applications is further described with reference to the accompanying drawings in which.

Figure 4:
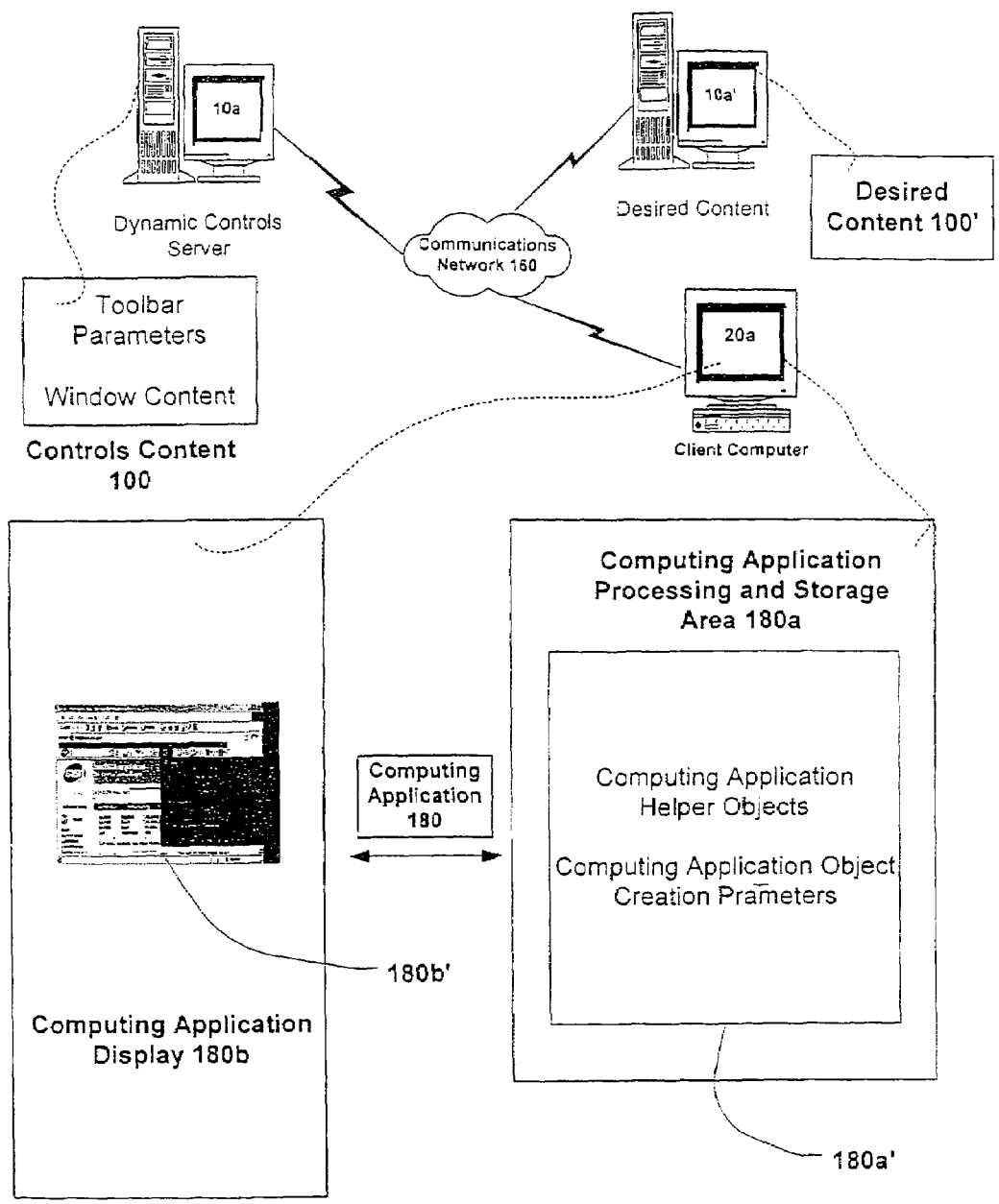
FIG. 4 is a block diagram representing the interaction between a client computer having a computing application and a server computer when utilizing the present invention.
Figure 4A:
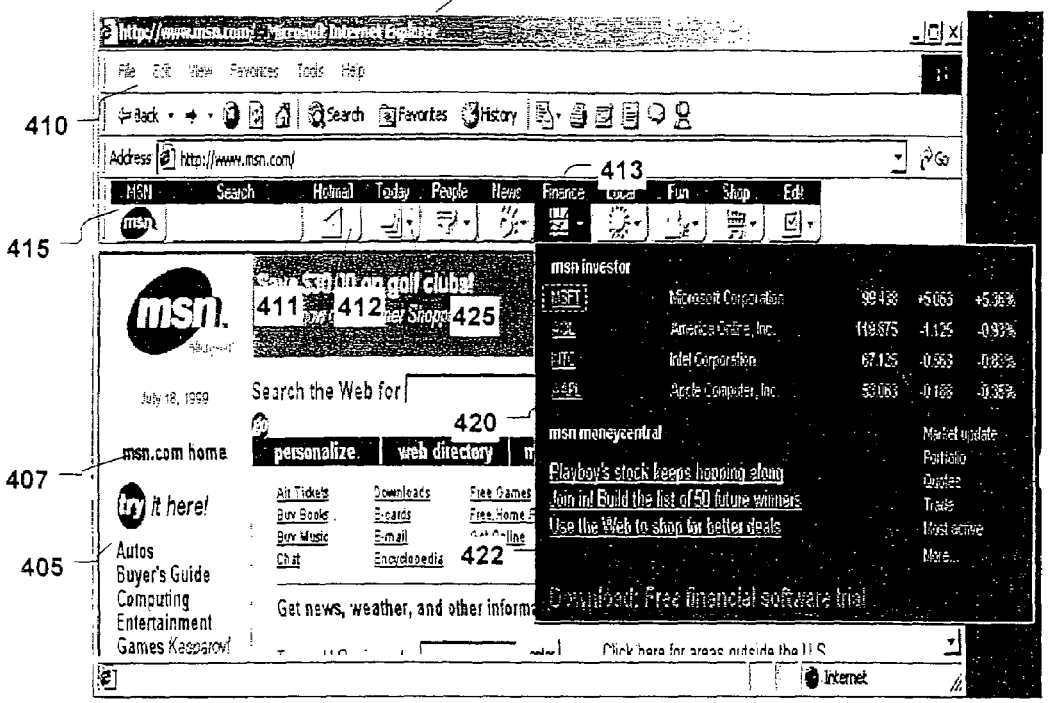
Figure 4B:
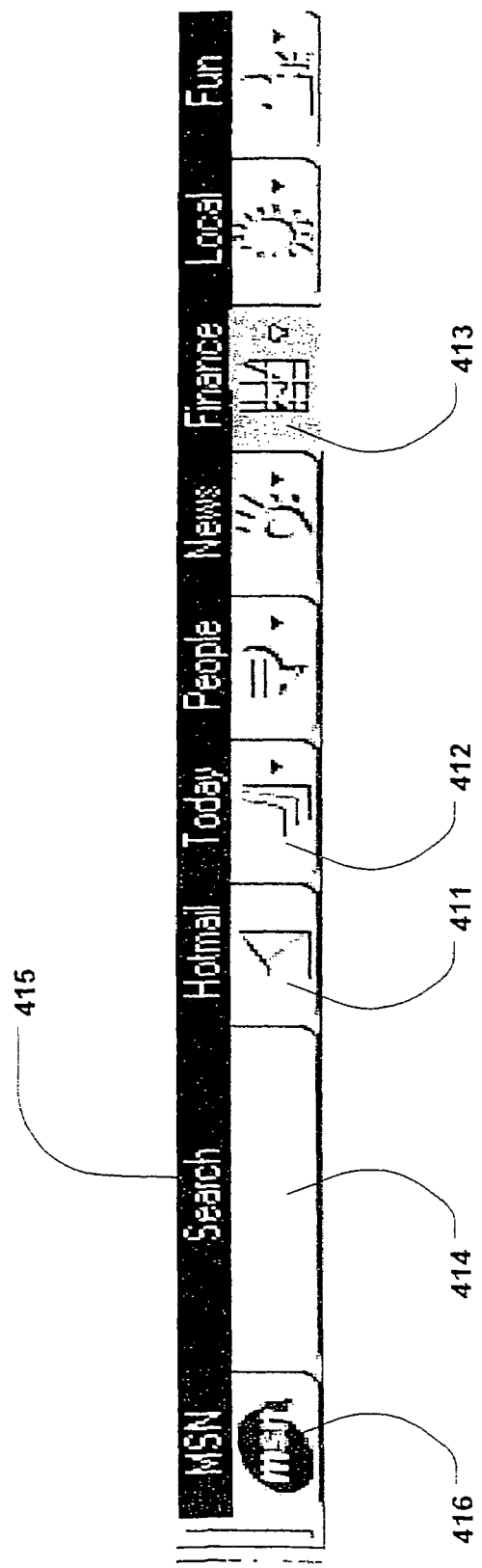
Figure 4C:
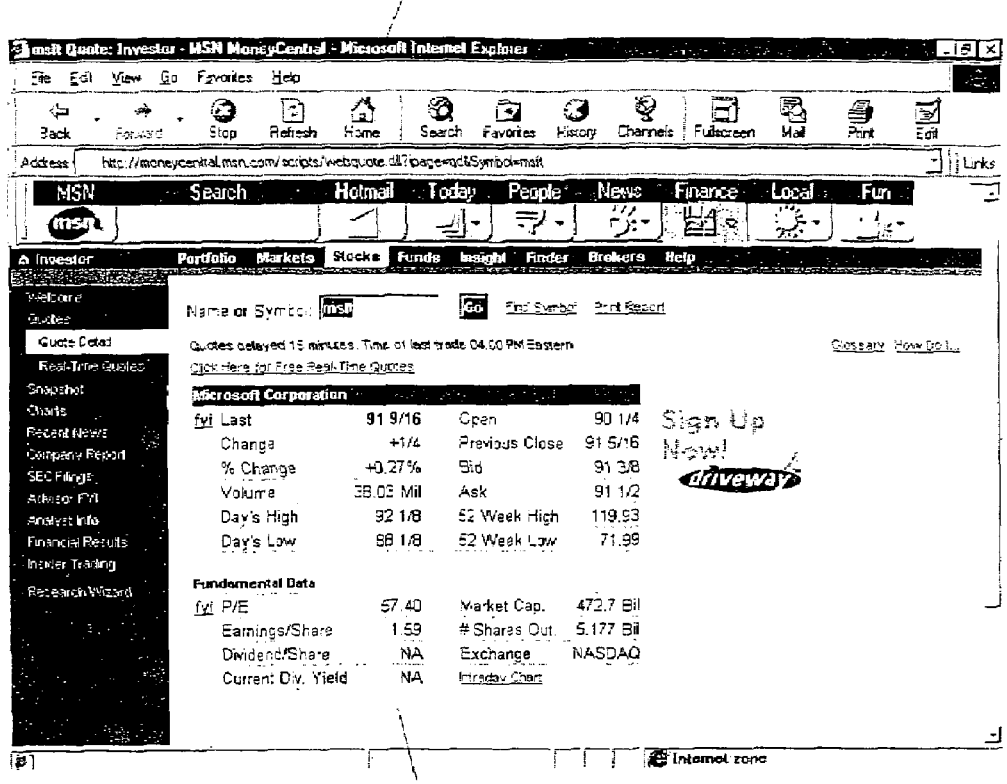
Figure 4D:
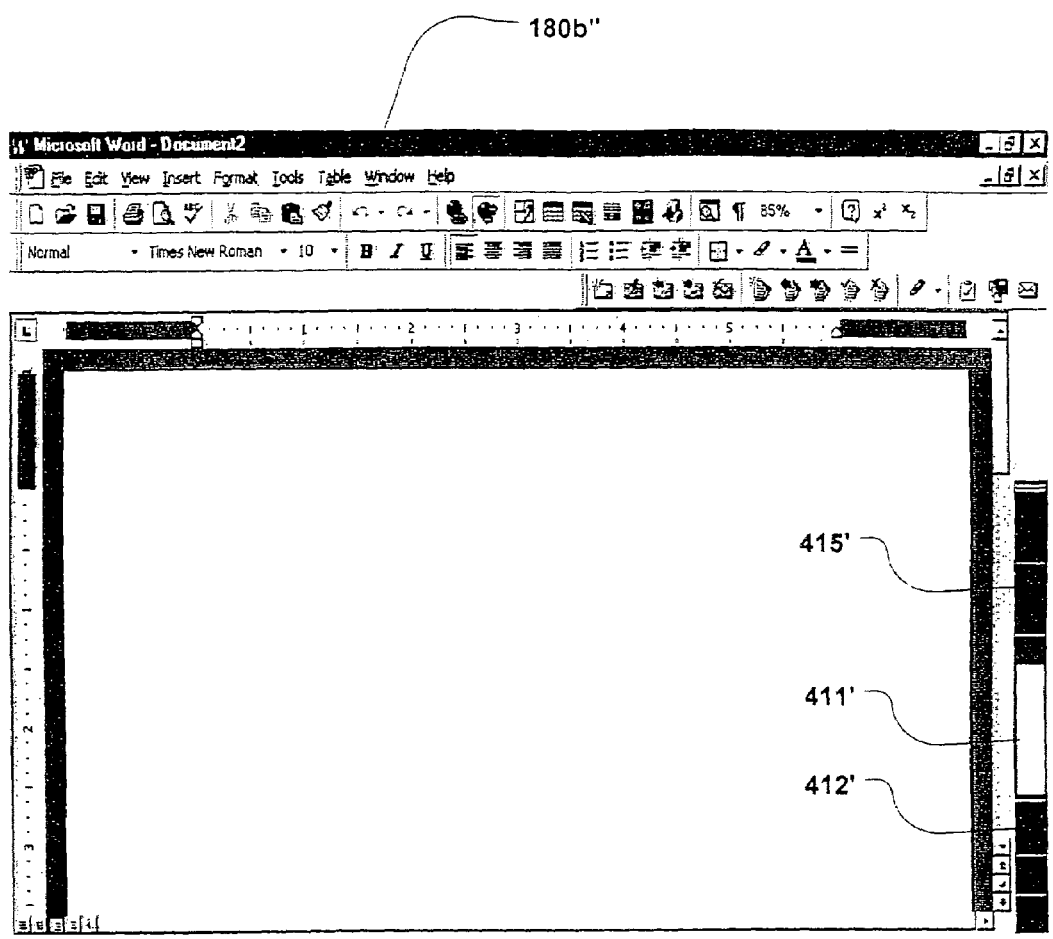
Figure 5:
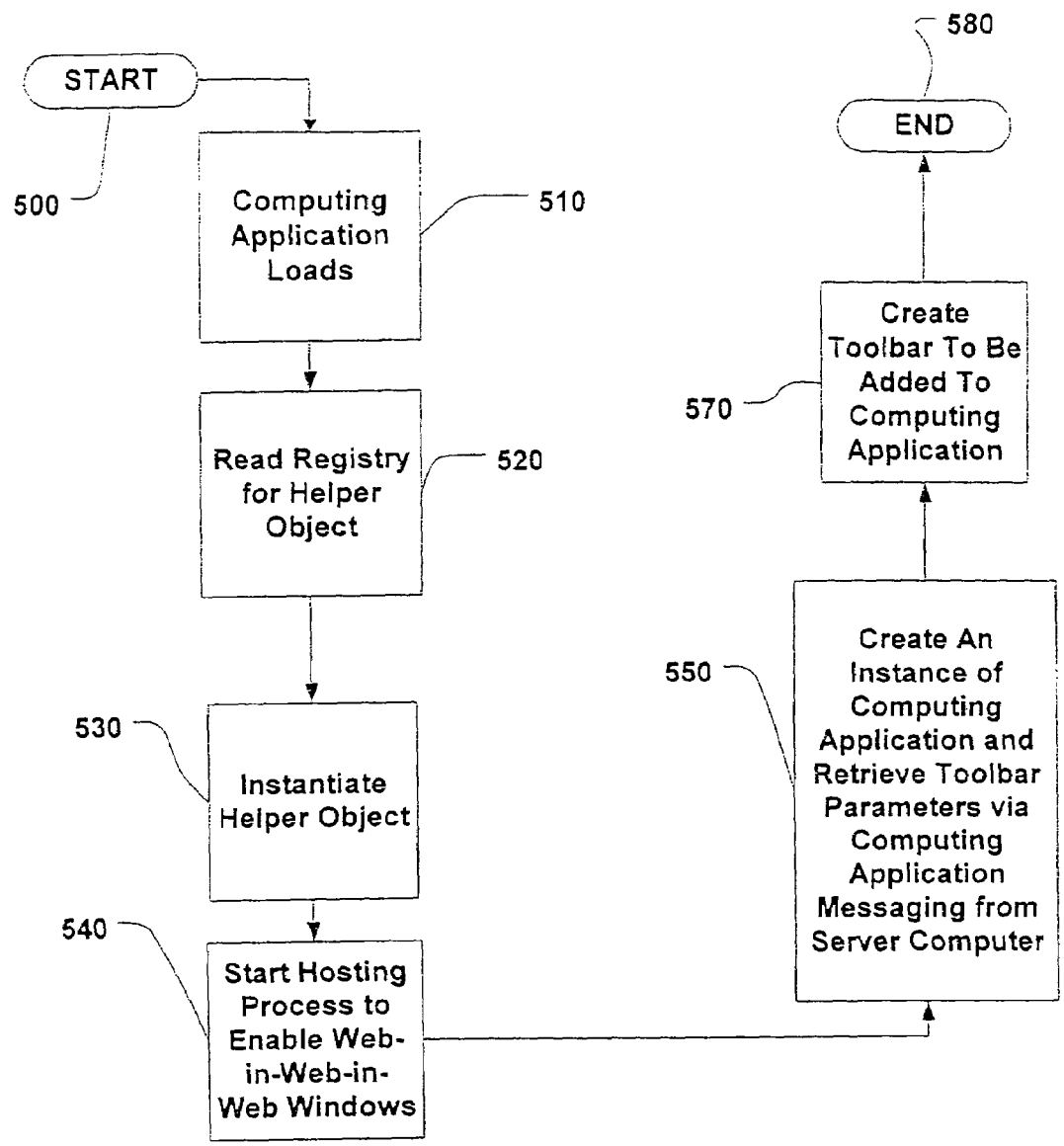
Figure 6:
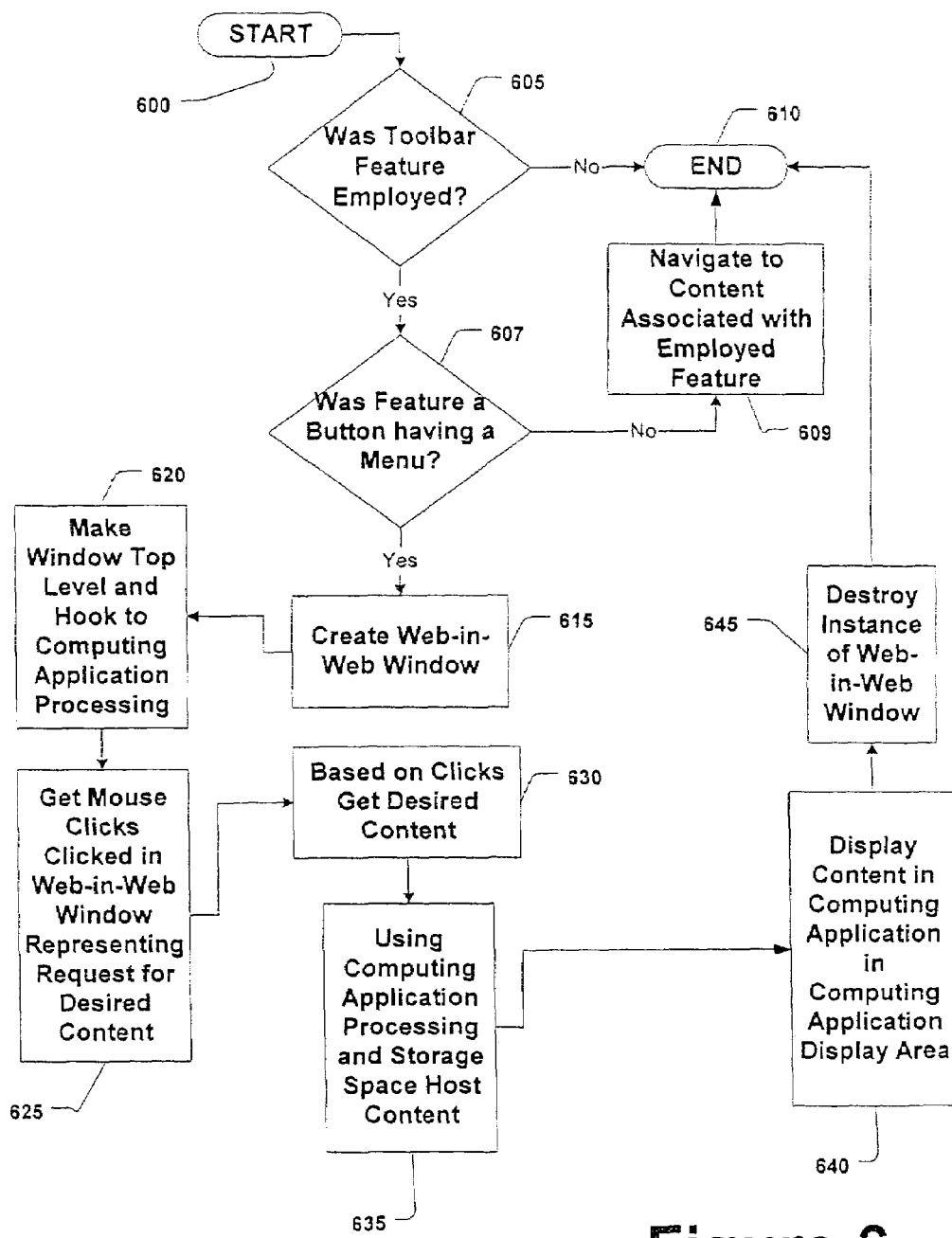

FIG. 4*a* is a snapshot of an illustrative computing application having features in accordance with the present invention;

FIG. 4*b* is a detailed snapshot of the toolbar feature of the present invention;

FIG. 4*c* is a detailed snapshot of the illustrative computing application of FIG. 4*a* when using the present invention to retrieve desired content from the newly added toolbar and Web-in-Web panes, respectively;

FIG. 4*d* is a snapshot of an alternative illustrative computing application having features in accordance with the present invention;

FIG. 5 is a flow diagram of the processing performed by the computing application when including the adaptable toolbar maintaining Web-in-Web panes; and FIG. 6 is a flow diagram of the processing performed by the newly added toolbar in cooperation with the computing application when processing a request for content from the newly added toolbar;

DETAILED DESCRIPTION OF ILLUSTRATIVE EMBODIMENTS

Overview

The present invention was developed to provide dynamic and updateable panes and toolbars for use in computing applications. In a computer system running computing applications, a computing application is generally limited to displaying static, pre-defined, and hard-coded panes and toolbars to operators. In the context of the Internet and the Web, computer operators are afforded little control, if any, in how content may be displayed for interaction. Generally, a Web browser computing application is a computing application that resides on a client computer that interacts with a Web server computing application, that hosts content and is housed on a server computer. These applications cooperate via pre-defined communication protocols (such as HTTP, FTP, or Gopher) and communicate information from each other relevant to an operator's request for content. With existing Web browser computing applications, operators may interact with requested content through pre-defined panes and toolbars. These controls are generally pre-defined and hard coded as part of the Web browsing computing application.

Some Web browser computing applications allow operators to open multiple Web browser panes within a Web browsing session. However, an operator is foreclosed from customizing controls within the Web browser computing application that may better reflect content preferences since such controls are hard coded within the Web browser computing application. As these controls are hard coded, and not easily updated, an operator of this Web browser application is corralled into using these controls when interacting with content. Furthermore, existing Web browser computing applications do not allow an operator to define controls to navigate to or manipulate frequently requested content. Thus, an operator cannot pre-select content to associate with the navigation and manipulation controls.

During operation, an operator launches a Web browser computing application. As part of the launch, existing Web browser computing applications look to the client computer on which they are housed for parameters to define the panes and toolbars used for controlling content. This information is stored local to the computing application and generally defines the functions, look, and feel of the panes and toolbars used to interact with content. Although not impossible, it is very difficult to change or modify these parameters as they are hard coded within the Web browser computing application. Furthermore, an operator of a Web browser computing application would be forced to take on this arduous and time consuming task of parameter manipulation every time an operator desired to change such controls. Thus an operator is better suited not to attempt to modify the controls offered by existing computing applications.

The present invention contemplates solutions to the problems described above. With the present invention an operator is provided with adaptable panes and toolbars to facilitate content interaction. That is, new controls are added as part of a Web browser computing application framework allowing for the creation of panes and toolbars that are capable of receiving and displaying adaptable content. These controls interact with existing computing applications and simply are added on to these applications to provide such control.

In an illustrative implementation, the adaptable panes may serve as space for pull down menus associated with buttons found on adaptable toolbars. For example, in the context of Web browser computing applications, a toolbar may be added to the framework of the Web browser computing application. This toolbar would contain buttons, capable of maintaining pull-down menus, used to direct an operator to various desired content. Further, the pull-down menus act in themselves as additional instances of Web browsing sessions. That is, the functionality maintained by these pull down menus conform to functionality conventionally supported by the traditional Web browser computing applications. By doing so, an additional Web browsing session is created for each pull down menu. This concept is described as Web-in-Web panes. However, unlike conventional Web browsing sessions, the content found in these pull down menus Web browsing session is pre-defined. The operator may pre-define the content of the menus in accordance with their content preference. Moreover, the content found in the pull down panes is dynamic as it may be updated continuously by the server computer, or discretely in response to an action performed by the operator on the client computer.

Unlike traditional toolbars, however, this newly added toolbar does not receive its parameters that define its content, look, feel, and function from the Web browser computing application itself, but rather from a cooperating server computer. These parameters are hosted on the server computer and may be accessed through a communications network. An operator may update these parameters to reflect a change it their content preference. Accordingly, upon use, the toolbar is updated with buttons to reflect controls to access this newly desired content. The parameters for the toolbar may be conveyed to the computing application through a messaging scheme that offers flexibility in the definition of the functions and appearance of the toolbar (i.e. the schema of the toolbar). As an example, these parameters may be conveyed trough the use of XML to a computing application.

By way of example, a computing application operator may choose to run the MICROSOFT INTERNET EXPLORER Web browser computing application. In the absence of the present invention, this Web browser computing application does not allow an operator to have customized control to interact with desired content. However with the inclusion of the present invention, a customizable, updateable, dynamic toolbar having Web-in-Web panes may be added to provide adaptable panes . These panes may act to navigate an operator to desired content without the need for the operator to navigate the main Web browser computing application.

An operator running a computing application with the present invention may choose the controls that would appear on the newly added toolbar. In addition, the operator may choose the content that is maintained by these controls. For example, an operator who is keen on finance may choose to include a control, labeled as "Finance", on the toolbar that when utilized triggers a Web-in-Web panes having finance related content. Accordingly, the operator may also choose the content that would appear in the Web-in-Web panes. In operation, the Web browser computing application would launch and retrieve the parameters from a cooperating server computer that are used to create the newly added toolbar having Web-in-Web panes. Included in these parameters may be parameters that are directed to create the "Finance" button on the toolbar, as well as content to populate the Web-in-Web pane that is associated with the "Finance" button. Such content may include updated price information about securities, links to retrieve information about securities, and links to news stories about financial matters. When an operator uses the "Finance" button on the newly added toolbar, a Web-in-Web pane is generated maintaining all of the pre-defined customized content.

Stated differently, the Web-in-Web panes contain user interface elements that can display HTML from Web server computer hosting content. When an operator clicks on a button in the newly added toolbar, a special Web-in-Web pane is displayed. The Web-in-Web panes will navigate to specified content (i.e. a specific URL). This allows the operator to view specialized content over the Internet without having to navigate the main Web browser computing application.

Further, when the operator clicks on an URL contained within the Web-in-Web panes, the main Web browser computing application will navigate to the desired URL and the Web-in-Web panes will be destroyed. Also, if the Web-in-Web pane is displayed, and the user clicks on another panes or somewhere else on the desktop, the Web-in-Web pane is destroyed. Lastly, if the Web-in-Web panes is displayed, and the user clicks on another button on the MSN Assistant toolbar, the Web-in-Web panes is destroyed.

For example if the present invention is used with MICROSOFT INTERNET EXPLORER, when directed (i.e. operator clicks a button that is defined as a Web-in-Web pane), an MSN Assistant object will create a "host" panes. The host pane is used to contain an instance of MSHTML.DLL as a document object and becomes known as a MSHTML pane. A moniker will then be created and the MSN Assistant object will navigate to the correct URL.

The MSHTML pane is sub-classed so that interesting pane messages to the Web browser application may be parsed. This is done to keep the MSHTML page in a modeless state. For example, when the Web-in-Web panes is being displayed and the operator switches in between computing application, the Assistant will know to destroy the Web-in-Web panes. The Web browser computing application determines that focus has changed because the MSHTML panes will be destroyed. This may be accomplished since the MSHTML pane is sub-classed.

In an alternative implementation, an operator's customized controls and content information, used to create and populate the dynamic and updateable panes of the present invention, may be stored in a server computer. This information may be compared with future content usage such that an affinity may be derived. Content providers, in turn, may use this affinity to provide distinct content and control features to the operator's computing application.

As will be described below with respect to FIGS. 1-6, the present invention is directed to a system and methods providing adaptable controls for computing applications used to interact with content. In accordance with a illustrative embodiment thereof, the present invention comprises a system and method to provide panes and toolbars that may be customized, updated, and are dynamic.

In one embodiment, described more fully hereinafter, the methods and apparatus of the present invention may be implemented as part of a computer network such as the Internet having a plurality of server computers representing Internet content providers hosting content, such as Internet domains. Further, a plurality of users (i.e. client computers) are connected to the computer network through computer hardware and software (i.e. Web browsers) such that the user may request, transmit, and receive Internet content. Although the depicted embodiment provides adaptable panes and toolbars for use with Web browser computing applications, those skilled in the art will appreciate that the inventive concepts described herein extend to various computing applications providing control over content.

Illustrative Computing Environment

Figure 1:
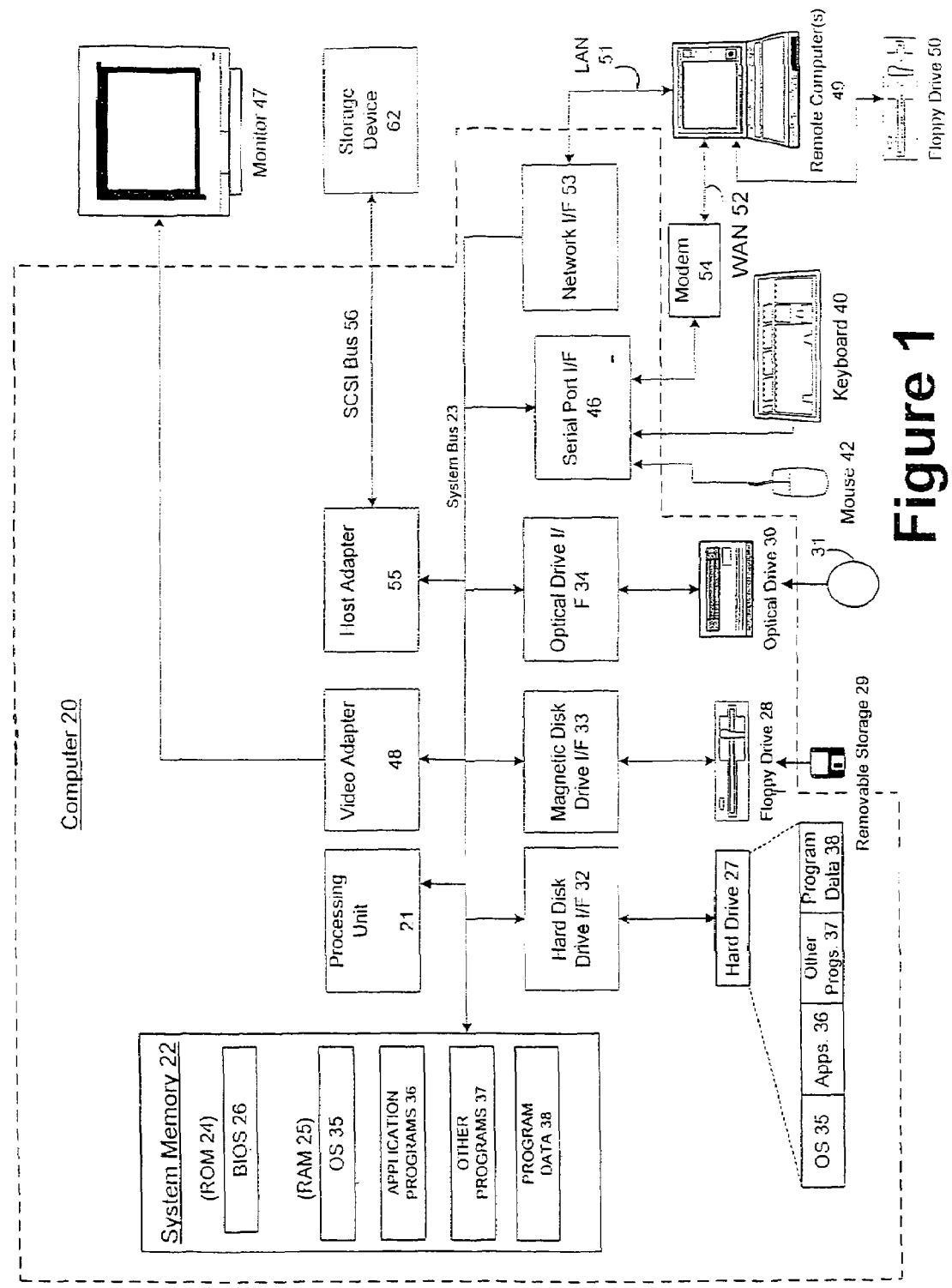
FIG. 1 is a block diagram representing a general purpose computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. In addition, the personal computer may also cooperate with data storage device 62 for use in storing and retrieving data. Storage device 62 may be connected to computer 20 through SCSI bus 56. SCSI bus 56 is shown to be coupled with host adapter 55 which is connected to the system bus 23. The drives and storage devices and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Computer Network Environment

Figure 2:
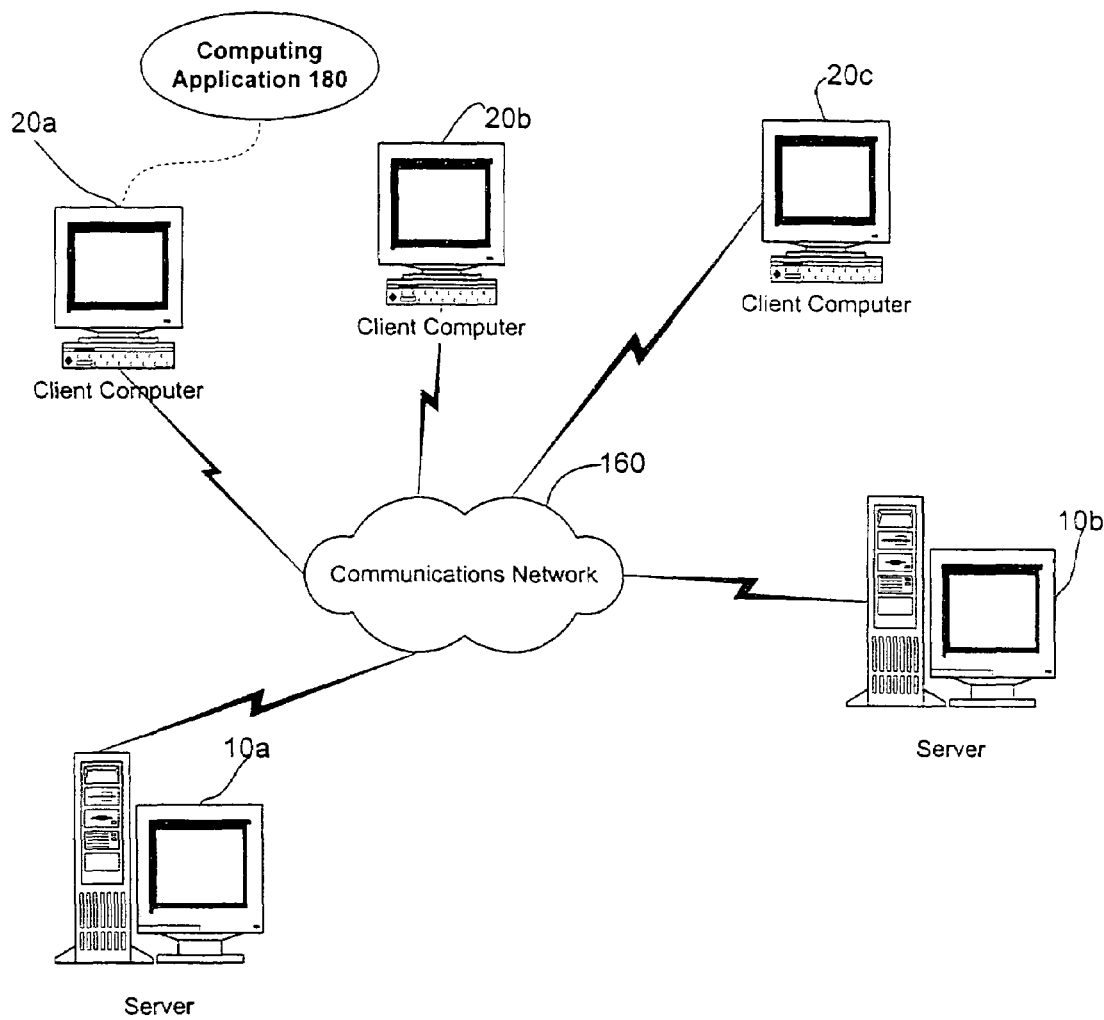
FIG. 2 is a block diagram representing an exemplary network environment with a server in accordance with the present invention.

As noted, the computer described above can be deployed as part of a computer network. In general, the above description applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10.

Thus, the present invention can be utilized in a computer network environment having client computers for accessing and interacting with the network and a server computer for interacting with client computers. However, the dynamic and updateable panes and toolbar apparatus and associated methods of the present invention can be implemented with a variety of network-based architectures, and thus should not be limited to the example shown. The present invention will now be described in more detail with reference to a presently illustrative implementation.

Adaptable Controls

Figure 3:
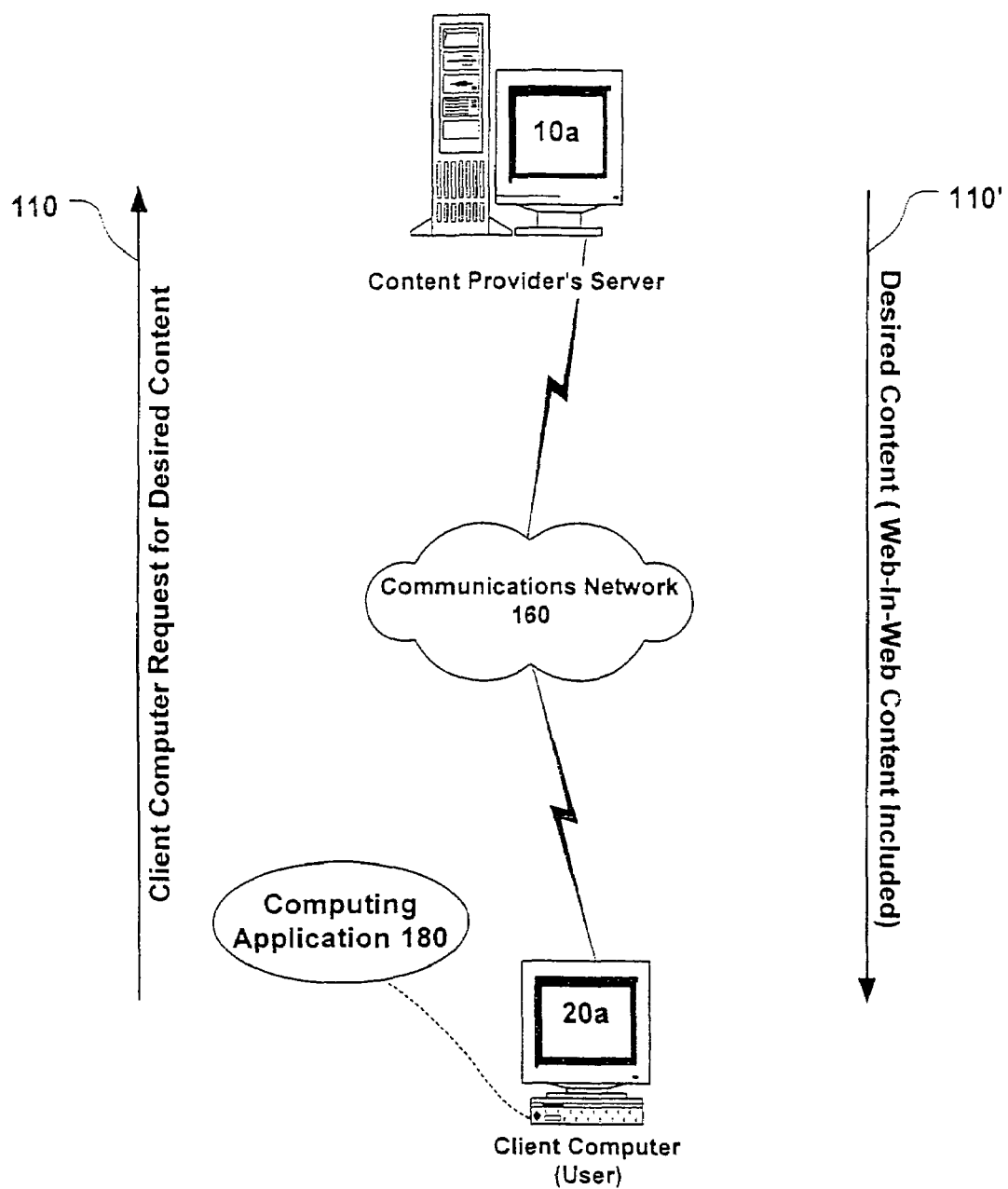
FIG. 3 is a block diagram of an HTML document with content being transmitted from a server to a client computer in accordance with the present invention.

Content providers seek to provide computing application operators with adaptable controls in their computing applications to better enhance an operator's interaction with the content. The instance of the dynamic panes and/or toolbars generally depend on parameters that are associated with the operation of the computing application. FIG. 3 shows an illustrative embodiment of the interaction between a computing application 180 and a content provider when handling content used to populate the dynamic and updateable panes and toolbars. This cooperation, as described in FIG. 3, is contemplated in a computer network context. As FIG. 3 shows, content providers may provide dynamic panes and toolbar content to operators through a cooperation between client computer 20a (representing a computing application operator of a computer network) and a server computer 10a (representing a desired content provider). This cooperation is realized via the transmission of data over communication network 160. Furthermore, client computer 20a may retrieve the dynamic panes and toolbar content from a content provider's server 10a by sending a request for content 110 over communications network 160. In turn, content provider's server computer 10a receives request 110, processes request 110 and passes back content 110' to client computer 20a. Included in the content 110' is data to populate the dynamic and updateable panes and toolbars (not shown) of computing application 180.

For example, a computer application operator may launch computing application 180 found on client computer 20a. Upon launch, computing application 180 may send a request or multiple requests (e.g. a request for Web content from content provider's server 10a to populate the dynamic panes of computing application 180, or in the alternative, a request for content to populate the dynamic toolbars), for content from a given content provider. The content is transmitted to the client computer 20a over communications network 160 for use in computing application 180. Further, during operation, the computer application operator may send additional requests to update the content found in the dynamic and updateable panes and toolbars. Stated differently, computing application 180 facilitates operator interaction with desired content by providing dynamic and updateable panes and toolbars (not shown) capable of receiving and displaying various content 110'. Further, the type and form of the content 110' found in the updateable and dynamic panes and toolbars may be pre-selected by the operator to reflect the operator's interests and sent by the content provider when responding to requests for panes and toolbar content.

FIG. 4 shows the interaction that occurs between client computer 20a and content provider's server 10a when utilizing computing application 180 to create dynamic computing application controls. As FIG. 4 shows, the present invention may be operated in a computing environment having a plurality of server computers, that is, server computer 10a and server computer 10a'. Server computer 10a (Dynamic Controls Server) may host controls content 100 and Desired content server computer 10a' may host desired content 100'. As shown, client computer alpha 20a maintains computing application 180. Computing application 180 comprises a computing application display area 180b and a computing application processing and storage space 180a. In an illustrative implementation, when operating, client computer 20a launches computing application 180 upon an operator's (not shown) request for computing application 180. When launched, client computer alpha 20a communicates with server computer through communications network 160 to retrieve controls content 100 that is used to create dynamic and updateable panes and toolbars. Controls content 100 generally comprises parameters that define the functions, look, and feel of an add-on toolbar and the content used to populate the dynamic panes that are maintained by the add-on toolbar. Further controls content 100 may be customized and/or updated by an operator (not shown) to reflect changes in an operators preference for toolbar features or panes content. Once retrieved, controls content 100 is processed with computing application parameters 180a' in computing application processing and storage area 180a. Computing parameters 180a' may comprise computing application helper objects and computing application object creation parameters. When processed, computing application parameters 180a' and controls content 100 are used to create computing application having dynamic controls 180b' that is displayed in computing application display area 180b.

In an alternative implementation scheme, managers of server computer 10a may collect data relevant to an operator's usage of desired content and create an affinity between the usage of a given operator and control features that are offered. This usage information may be stored in application cookies that are processed by content provider servers. Employing the usage information stored in these cookies, content provider managers may ascertain an affinity between the operator's usage behavior and the features that can be offered. With this affinity content providers may offer new features and/or content to an operator, thereby linking the operator's dynamic controls with the operator's usage. Moreover, as an operator's usage behavior changes, so too does the affinity and correspondingly different features may then be offered.

For example, a content provider may ascertain an affinity for financial information for an operator that frequently requests financial related content. This affinity may be determined since the operator's usage behavior (i.e. financial related content requests) may be stored in application cookies that are processed by the control content server to create such affinity. The affinity may then be compared with the features and/or content that may be offered to populate the operator's dynamic controls. Accordingly, based on this determined affinity (i.e. the processing of the application cookies that maintain the operator's usage behavior) new financial features and/or content may be added to the operator's dynamic controls.

FIGS. 4a-4c describe an illustrative implementation of a computing application having dynamic controls as contemplated by the present invention. This illustrative implementation utilizes the MICROSOFT INTERNET EXPLORER Web browser computing application as the contemplated computing application. As shown in FIG. 4a, computing application having dynamic controls 180b' comprises a Web browser computing application 180'. Web browser computing application 180' comprises a display area 405 where content 407 is displayed, navigated, and manipulated. This content 407 is generally controlled in the display area 405 by conventional static controls 410. Further, FIG. 4a and FIG. 4b shows add-on customizable dynamic toolbar 410 having feature buttons 411, 412, and 413 that when employed may trigger pull down adaptable panes 420 (Web-in-Web panes). These panes are created such that they may be seen on the client computer 20a (of FIG. 4) display regardless of the position of the Web browser computing application 180'. Further, as FIG. 4b shows, dynamic toolbar 415 may maintain additional feature buttons and fields, 414 and 416. Unlike their counterpart buttons, 411, 412, and 413, buttons and fields 414 and 416, when utilized, do not trigger pull down menus, but rather perform independent functions. As indicated by FIG. 4b, feature 414 comprises a search field that may be used by an operator (not shown) to perform various queries. The results of the queries may be displayed as content 407 in display area 405 of Web browser computing application 180'. Also, feature 416 acts as a shortcut to navigate to pre-defined content (i.e. in the example shown the Microsoft Network Web Site).

Looking back to FIG. 4a, Web-in-Web panes 420 further comprise content 422. In operation, a feature button 413 of dynamic toolbar 415 may be depressed by an operator (not shown) of Web browser computing application 180'. When depressed, feature button 413 triggers dynamic panes 420 that maintains content relevant to the description of feature button 413. For example, as shown feature button 413 has a description of "Finance". Accordingly, content 422 found in panes 420 relates to "Finance" type information, such as stock quotes or news stories about financial services. Content 422, in addition to general content, may contain links 425 to navigate to additional content relevant to listed information. For example, as shown in FIG. 4a, a price quote is listed for the MICROSOFT stock having the symbol MSFT. This symbol is represented as a link 425 indicating to the operator (not shown) that there is additional content that the operator may navigate. When the additional content (425' of FIG. 4c) is requested (i.e. by cooperating with the listed content link), the Web browser computing application 180' navigates to the additional content (425' of FIG. 4c that may be found on desired content server computer 10a' having desired content 100', as shown in FIG. 4) and the dynamic panes 420 is destroyed. As shown in FIG. 4c, Web browser computing application 180' may navigate to the additional content 425' in response to an interaction with the additional content link 425.

FIG. 4d shows the implementation of dynamic controls in an alternative computing application 180b". As shown these controls may take on the form of a adaptable add-on toolbar 415' having feature buttons or controls 411' and 412'. These features when utilize provide additional controls to an operator (not shown) of the computing application 180b". Toolbar 415' is created in a manner as described by FIG. 4 such that an operator may change the features and/or content of these dynamic controls to reflect a change in their feature or content preferences.

FIG. 5 shows the processing performed by computing application 180b' or computing application 180b" to create and cooperate with dynamic controls (i.e. dynamic toolbars 415, 415' and dynamic panes 420). Processing starts at block 500 and proceeds to block 510 where the computing application is loaded. Once loaded, computing application 180b' or 180b" reads its registry to see if there is a helper object present at block 520. Once read, the helper object is instantiated at block 530. After which, computing application processes the helper object at block 540 in a process that enables the hosting of Web-in-Web panes (420 of FIG. 4a). An instance of the computing application is created at block 550. Additionally, at block 550, computing application retrieves dynamic toolbar parameters via computing application messaging from a remote server computer. The dynamic toolbar is created and added to the instance of the computing application at block 570. Processing then ends at block 580.

FIG. 6 shows the processing performed by computing application when utilizing the created dynamic toolbar to navigate to content. Processing starts at block 600 and proceeds to block 605 where a check is performed to determine if a feature of the toolbar was employed. If there is no interaction with the toolbar processing ends at block 610. However, if the alternative is true a subsequent check is performed at block 607 to determine if the interaction performed with the toolbar employed a button having a pull down menu. If it is not a feature of this kind, processing proceeds to block 609 where the computing application is navigated to content associated with the employed feature. However, if the feature employed at block 607 is the kind that supports a pull down menu, a Web-in-Web panes is created at block 615. The panes is then placed on the top level of the display and hooked to computing application processing at block 620. The computing application then polls for mouse clicks in the Web-in-Web panes at block 625. Using the clicks (representing a request for desired content) computing application retrieves the desired content at block 630. The content is then hosted by computing application at block 635. The content is displayed by the computing application at block 640. The Web-in-Web panes is then destroyed by the computing application at block 645. Processing then ends at block 610.

In sum, the present invention provides a system and process for providing dynamic controls to operators of computing applications, preferably using an add-on adaptable toolbar maintaining pull down menus having adaptable panes. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. In a computer system having at least one client computer hosting at least one computing application, electronically coupled to at least one server computer hosting parameter and content information specific to creation and function of adaptable panes, a method for providing adaptable toolbar controls comprising:
    launching the computing application;
    processing information relevant to the creation of adaptable toolbar controls during the launch of the computing application, wherein the adaptable toolbar controls are customizable for each instance of the computing application;
    retrieving the parameter and content information specific to the adaptable toolbar controls from the server computer by the computing application during the launch of the computing application; and
    creating the adaptable toolbar controls by the computing application using the parameter and content information retrieved from the server computer, wherein if the client computer is not connected to the server computer, the computing application retrieves parameters and content for the adaptable toolbar controls from cache of the computing application or from storage space local to the computing application.

2. The method recited in claim 1, wherein launching the computing application occurs in response to instruction from an operator.

3. The method recited in claim 1, wherein creation of the adaptable toolbar controls occurs in response to instruction from an operator.

4. The method recited in claim 1, wherein the processing information relevant to the creation of the adaptable toolbar controls comprises:
    (a) locating a helper object within a registry of the computing application; and
    (b) using the helper object to allocate processing resources to support the creation of additional controls within the computing application.

5. The method as recited in claim 1, wherein processing information relevant to the creation of the adaptable toolbar controls comprises processing retrieved parameter and content information by the computing application to parse information relevant to function, look, and feel of the adaptable toolbar controls.

6. A system for providing adaptable toolbar controls, the system comprising:
    at least one client computer hosting at least one computing application;
    at least one server computer hosting parameter and content information specific to creation and function of adaptable panes;
    a network communicatively coupling the at least one client computer to the at least one server computer;
    a processor associated with the at least one client computer, the processor having access to memory having instructions which, when executed, perform a method for providing adaptable toolbar controls, the method comprising:
        launching the computing application;
        processing information relevant to creation of adaptable toolbar controls during the launch of the computing application, wherein the adaptable toolbar controls are customizable for each instance of the computing application;
        retrieving the parameter and content information specific to the adaptable toolbar controls from the at least one server computer by the computing application during the launch of the computing application; and creating the adaptable toolbar controls by the computing application using the parameter and content information retrieved from the at least one server computer, wherein if the at least one client computer is not connected to the at least one server computer, the computing application retrieves parameters and content for the adaptable toolbar controls from cache of the computing application or from storage space local to the computing application.

7. The system of claim 6, wherein the parameter and content information indicative of the adaptive toolbar controls comprises schema information relevant to function, look, and feel of the adaptive toolbar controls.

8. The system of claim 6, wherein the parameter and content information indicative of the adaptable toolbar controls stored on the at least one server may be updated at any time.

9. The system of claim 8, wherein the update may be performed by accessing the parameter and content information via a Web browser computing application.

10. The system of claim 6, wherein the computing application comprises a Web browser computing application.

11. The system of claim 6, wherein the at least one server computer is a Web server hosting Web based content.

12. The computer-readable medium of claim 6, wherein the step of processing information relevant to the creation of the dynamic adaptable toolbar controls comprises processing retrieved parameter and content information specific to the adaptable controls by the computing application to parse information relevant to function, look, and feel of the adaptable toolbar controls.

13. A computer-readable medium having computer-executable instructions for performing a method for providing adaptable toolbar controls in a computer system having at least one client computer hosting at least one computing application, electronically coupled to at least one server computer hosting parameter and content information specific to creation and function of adaptable panes, the method comprising:
- launching the computing application;
- processing information relevant to the creation of adaptable toolbar controls during the launch of the computing application, wherein the adaptable toolbar controls are customizable for each instance of the computing application;
- retrieving the parameter and content information specific to the adaptable toolbar controls from the server computer by the computing application during the launch of the computing application; and
- creating the adaptable toolbar controls by the computing application using the parameter and content information retrieved from the server computer, wherein if the client computer is not connected to the server computer, the computing application retrieves parameters and content for the adaptable toolbar controls from cache of the computing application or from storage space local to the computing application.

14. The computer-readable medium of claim 13, wherein the step of launching the computing application occurs in response to instruction from an operator.

15. The computer-readable medium of claim 13, wherein the step of creating the adaptable toolbar controls occurs in response to instruction from an operator.

16. The computer-readable medium of claim 13, wherein the step of processing information relevant to the creation of the adaptable toolbar controls comprises:
- (a) locating a helper object within a registry of the computing application; and
- (b) using the helper object to allocate processing resources to support the creation of additional controls within the computing application.

* * * * *